US012807074B2

(12) United States Patent
Bhujade

(10) Patent No.: US 12,807,074 B2
(45) Date of Patent: Nov. 24, 2026

(54) STORAGE CONSOLE FOR A VEHICLE

(71) Applicant: Faurecia India Pvt Ltd., Pune (IN)

(72) Inventor: Annasaheb Bhujade, Pune (IN)

(73) Assignee: FAURECIA INDIA PVT LTD., Pune (IN)

( * ) Notice: Subject to any disclaimer, the term of this patent is extended or adjusted under 35 U.S.C. 154(b) by 390 days.

(21) Appl. No.: 18/375,258

(22) Filed: Sep. 29, 2023

(65) Prior Publication Data

US 2024/0109496 A1 Apr. 4, 2024

(30) Foreign Application Priority Data

Sep. 29, 2022 (IN) ............................ 202221056084

(51) Int. Cl.
*B60R 7/04* (2006.01)
*B60R 11/00* (2006.01)

(52) U.S. Cl.
CPC ......... *B60R 7/04* (2013.01); *B60R 2011/0007* (2013.01)

(58) Field of Classification Search
CPC .......................... B60R 7/04; B60R 2011/0007
USPC ............. 296/24.34, 37.8; 297/411.2, 411.21, 297/411.32, 411.35, 411.37; 108/33, 37, 108/39, 44
See application file for complete search history.

(56) References Cited

U.S. PATENT DOCUMENTS

| | | | | | |
|---|---|---|---|---|---|
| 5,732,994 | A * | 3/1998 | Stancu | B60N 2/773 224/400 |
| 6,497,443 | B2 * | 12/2002 | Worrell | B60N 2/79 348/837 |
| 6,719,367 | B2 * | 4/2004 | Mic | B60R 7/04 297/188.14 |
| 7,029,049 | B2 * | 4/2006 | Rockafellow | B60N 2/763 296/1.09 |
| 7,416,235 | B2 * | 8/2008 | Rajappa | B60R 7/04 296/37.8 |
| 7,481,475 | B1 * | 1/2009 | Lim | B60R 7/04 296/37.8 |
| 7,520,552 | B2 * | 4/2009 | Nakamura | B60R 7/04 108/44 |
| 8,714,617 | B2 * | 5/2014 | Hipshier | B60R 7/04 296/37.8 |
| 11,034,306 | B2 * | 6/2021 | An | B60N 2/793 |
| 12,115,941 | B2 * | 10/2024 | Thomas | B60R 7/04 |
| 2001/0020620 | A1 * | 9/2001 | Katagiri | B60R 7/04 220/345.2 |

(Continued)

*Primary Examiner* — Amy R Weisberg
(74) *Attorney, Agent, or Firm* — Reising Ethington P.C.

(57) ABSTRACT

A storage console for a vehicle having at least one storage unit arranged beside a front row seat of the vehicle. The storage unit is partially enclosed by a housing. The housing is slidably arranged on the storage unit to slide linearly along a longitudinal plane of the storage unit between a first position and a second position. The housing has a lid for covering the storage unit. The lid is moveable along with the housing when the housing moves between first position and second position. The lid is movably arranged on a portion of the housing, in the first position of the housing the lid pivot around a pivotal axis to provide access to the storage unit. The housing has a side wall portion movable between a stowed position and a deployed position when the housing is in the second position.

12 Claims, 4 Drawing Sheets

(56) References Cited

U.S. PATENT DOCUMENTS

| | | | | |
|---|---|---|---|---|
| 2002/0089217 | A1* | 7/2002 | Scheerhom | B60R 7/04 297/188.19 |
| 2003/0155786 | A1* | 8/2003 | Kim | B60R 7/04 296/24.34 |
| 2003/0184133 | A1* | 10/2003 | Mic | B60N 2/793 297/115 |
| 2006/0131910 | A1* | 6/2006 | Cowelchuk | B60R 7/04 296/24.34 |
| 2006/0279123 | A1* | 12/2006 | Bazinski | B60N 2/793 297/411.35 |
| 2007/0069544 | A1* | 3/2007 | Sturt | B60R 7/04 296/37.8 |
| 2007/0152461 | A1* | 7/2007 | Joler | B60R 7/04 296/24.34 |
| 2008/0079278 | A1* | 4/2008 | Rajappa | B60R 7/04 296/24.34 |
| 2010/0090491 | A1* | 4/2010 | Hipshier | B60R 7/04 296/24.34 |
| 2010/0201147 | A1* | 8/2010 | Jones | B60N 2/777 296/24.34 |
| 2010/0244478 | A1* | 9/2010 | Depue | B60N 2/773 296/37.8 |

* cited by examiner

STORAGE CONSOLE FOR A VEHICLE

TECHNICAL FIELD

The present disclosure relates to the field of a vehicle storage compartment. More specifically, the present invention relates to a storage console for a vehicle interior.

BACKGROUND

Storage compartments or boxes are used inside vehicles particularly for storing articles, such as bottles, documents, coins, mobile phone, tablet and the like. Mostly, the storage boxes are arranged on the instrument panel or on a centre console of the vehicle for easy access for both the driver and the occupant. These centre console storage compartments, often act as an armrest for the vehicle passengers. The storage compartments in the centre console can be accessible only for the front row passengers.

There are mechanisms or secondary storage compartments provided on the centre console storage unit which can be accessible to the second-row passengers by sliding the console assembly or the secondary storage compartment. Such mechanism makes the centre console assembly complex and bulky.

Therefore, there is a need of a compact arrangement of centre console assembly which can overcome the above drawback(s) and provide a storage console for the vehicle.

OBJECTS AND SUMMARY

Some of the objectives of the present invention, which at least one embodiment herein satisfies are as listed herein below.

It is an object of the present invention to provide a storage console for a vehicle with two storage compartments accessible simultaneous to front row passengers and rear row passengers.

It is an object of the present invention to provide a storage console for a vehicle which has a foldable armrest unit to configure a tray to hold articles such as laptop, book and the like.

It is an object of the present invention to provide a storage console for a vehicle which has a compact arrangement to configure the storage compartment for the rear row passengers.

It is an object of the present invention to provide a storage console for a vehicle which has a simple mechanism for easy operation.

According to the present invention there is provided a storage console for a vehicle interior. The storage console may be arranged adjacent (e.g., beside) a front row seat of the vehicle. The arrangement of the storage console is advantageous for both front row passengers as well as rear seat passengers since the storage space of the storage console can be accessed by both row passengers.

The storage console may include at least one storage unit. The storage unit is adapted to store articles which can be accessible by the front row passengers. The storage unit is arranged adjacent/beside a front row seat of the vehicle. In an embodiment, the storage unit is fixed to the floor of the vehicle interior.

Further, the storage unit may be partially enclosed by a housing. The housing may cover at least one side portion of the storage unit and a back portion. The housing is slidably arranged on the storage unit. Specifically, the housing may be slidable linearly along a longitudinal plane of the storage unit between a first position and a second position. The first position is when the housing covers the storage unit and the second position is when housing is moved in a rearward position towards the second-row passengers. The housing configures a storage compartment in the second position for storing articles and the storage compartment is accessible to the second-row passengers. When the housing is in the second position, the front row passengers can access the front storage unit and the second-row passengers can access the storage compartment simultaneously.

Further, the housing has a lid for covering the storage unit. The lid is also moveable along with the housing when the housing moves between the first position and the second position. The lid is movably arranged on a portion of the housing such that in the first position of the housing the lid pivot around a pivotal axis to provide access to the storage unit. In the present embodiment, the lid is pivotally arranged on a top portion of the housing. When the housing is in the first position, the front row passengers can access the storage unit by lifting the lid around the pivotal axis.

The housing may have a collapsible side wall portion movable between a stowed position and a deployed position when the housing is in the second position. The side wall portion may be arranged at an inner side portion of the housing. When the housing is moved rearwards or in the second position, the side wall portion moves to the deployed position away from the inner side portion of the housing. In the deployed position of the side wall portion, the housing configures the storage compartment.

Further, the side wall portion may flush to the inner wall portion of the housing in the stowed position. Specifically, the side wall portion may have a corrugated side portion which connects with the inner portion of the housing. The corrugated side portion facilitates the movement of the side wall portion between the deployed position and the stowed position. In the stowed position, the corrugated side portion collapses and facilitates the side wall portion to flush against the inner side of the housing.

When the housing slides from the second position to the first position, the second-row occupant can remove the articles from the storage compartment and can flushes the side wall portion to the stowed position. In an embodiment, the side wall portion may have a locking arrangement to keep the side wall portion stay in the stowed position. In an embodiment, the lid or the housing may have a magnetic arrangement to arrest the side wall portion in the stowed position. In another embodiment, the storage unit may have a secondary storage space to accommodate the side wall portion when the housing slides back to the first position.

Further, the housing may be slidable on a guide arranged on the floor of the vehicle or on a periphery of the storage unit. The guide can be a channel or a rail like structure to facilitate the sliding motion of the housing towards the second position.

Further, the storage console has an armrest mounted on a top portion of the lid. In an embodiment, the armrest has a foldable unit which is swivelable around a rotational axis. The foldable unit has a first armrest portion and a second armrest portion. The first armrest portion and the second armrest portion are substantially flat members which are adjoined together on a side portion. Specifically, the first armrest portion and the second armrest portion are pivotally connected to the side portion such that the first armrest portion is foldable over the second armrest portion. When the first armrest portion is unfolded, the first armrest portion aligns in the same plane of the second armrest portion configuring a rectangular tray for holding articles. By way of non-limiting example, the tray can be used for holding a laptop or book or bottles or glasses.

In an embodiment, the storage console includes a locking and unlocking unit. The locking unit locks the position of the housing according to the user requirement. Specifically, the locking unit may prevent the sliding movement of the housing when the storage compartment is used by the occupants.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The disclosed embodiments are merely exemplary of the invention, which may be embodied in various forms. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

The present disclosure relates to a storage console arranged inside a vehicle interior.

Figure 1:
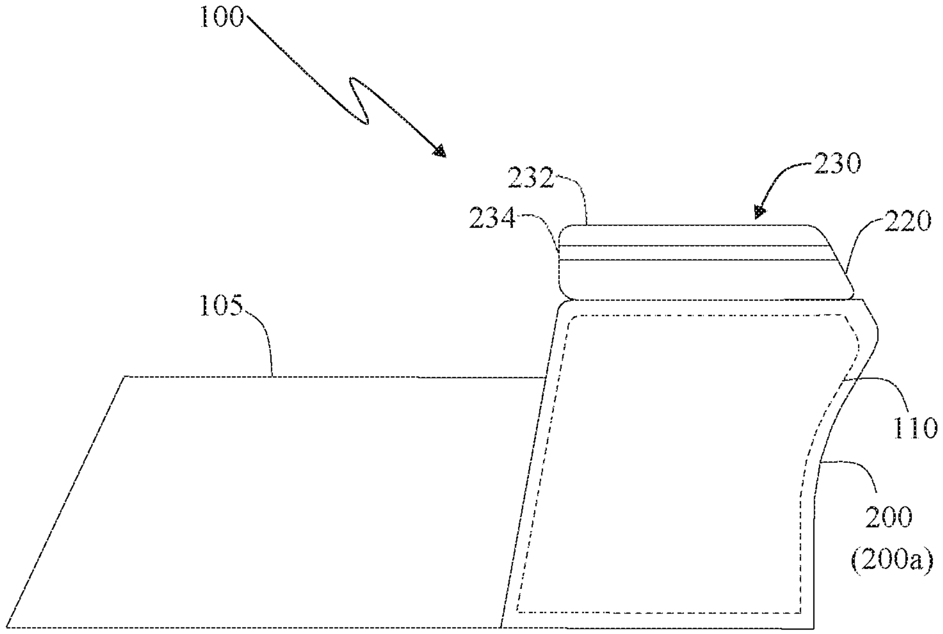
FIG. 1 illustrates an exemplary view of a proposed storage console for a vehicle in accordance with an embodiment of the present invention.

Referring now to FIG. 1, a storage console (100) for a vehicle interior in accordance with an embodiment of the present invention is illustrated. The storage console (100) is arranged adjacent (e.g., beside) a front row seat of the vehicle. Specifically, the storage console (100) is located between a front left seat and a front right seat, wherein said front left and front right seats comprise a first row of seats within said passenger cabin of said vehicle. The arrangement of the storage console (100) is advantageous for both front row passengers as well as rear seat passengers since the storage space of the storage console (100) can be accessed by both row passengers.

Figure 2:
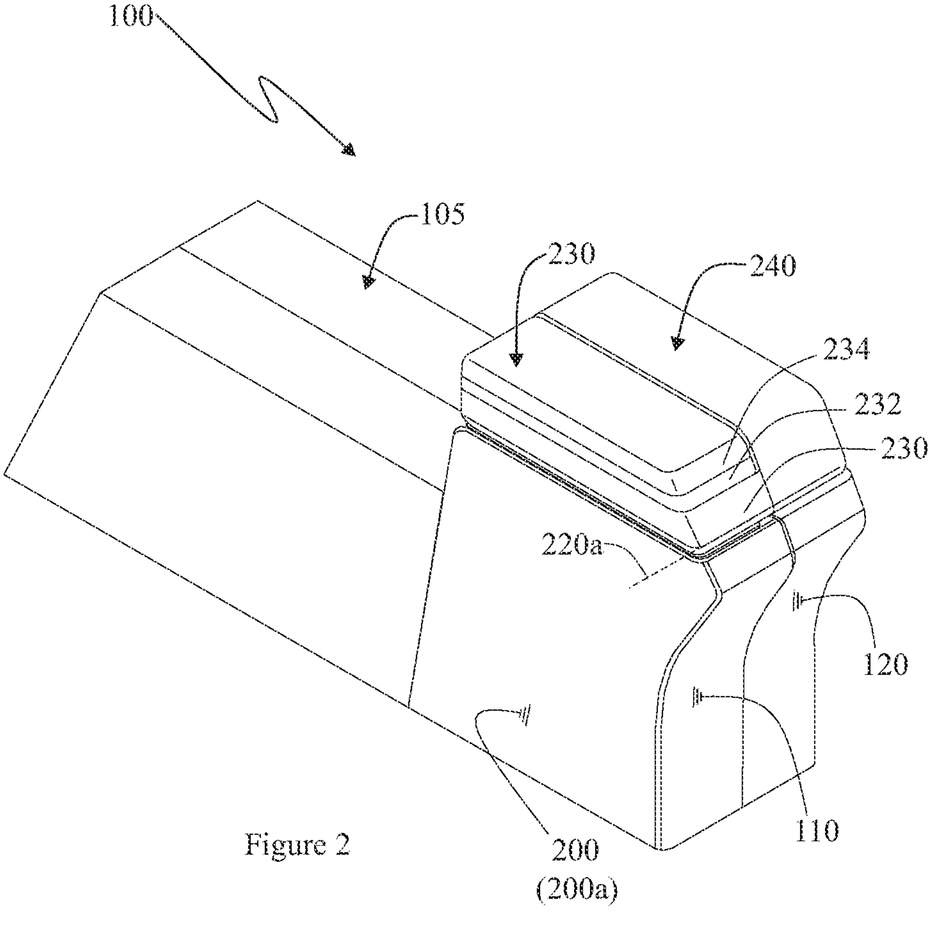
FIG. 2 illustrates a perspective view of the storage console.

The storage console (100) includes a base (105) and at least one storage unit (110) as shown in FIGS. 1 and 2. The storage unit (110) is fixed on the base (105). The storage unit (110) includes a storage space for storing articles therein and the storage unit (110) is adapted to store articles which can be accessible by the front row passengers. The storage unit (110) is arranged adjacent/beside a front row seat of the vehicle. In the present embodiment, the storage unit (110) is fixed to the floor of the vehicle interior.

Figure 3:
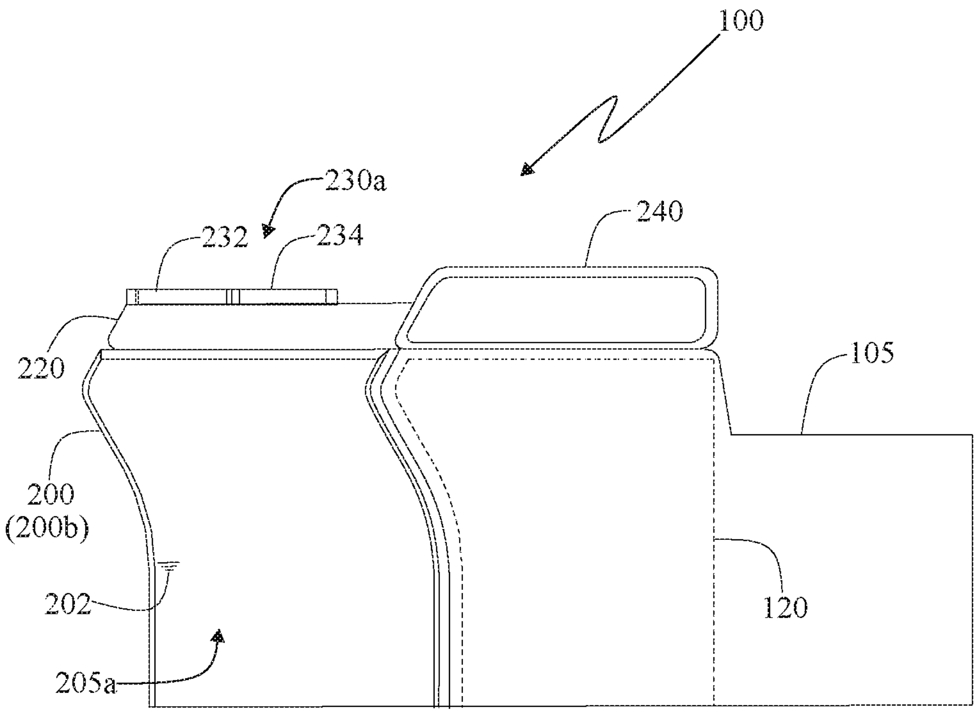
FIG. 3 illustrates a side view of the storage console with the housing in a second position.
Figure 4:
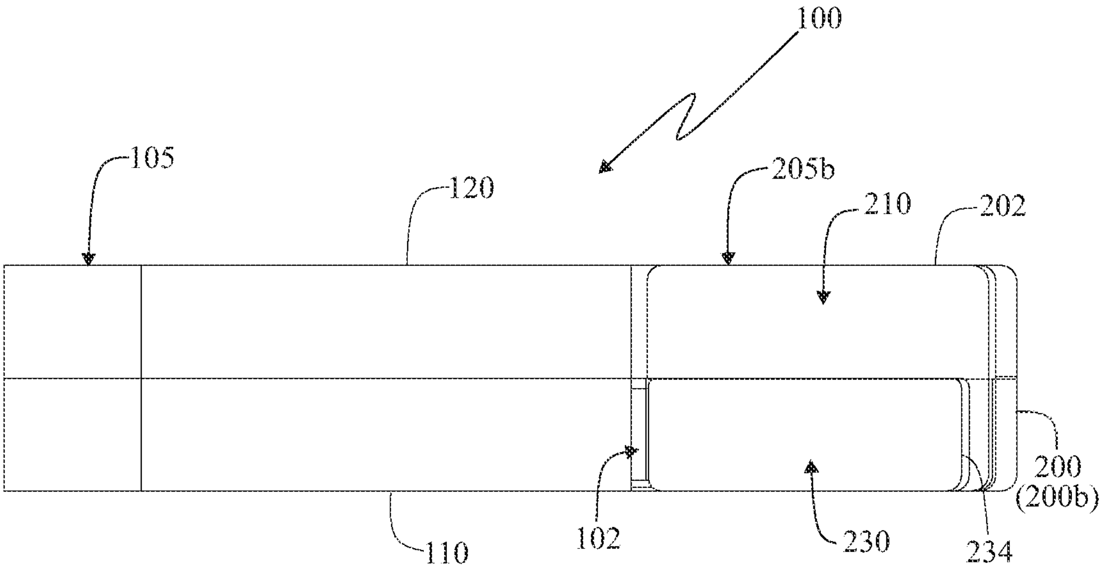
FIG. 4 illustrates a top view of the storage console when the housing configures a storage compartment in the second position.

Further, the storage unit (110) is partially enclosed by a housing (200). The housing (200) covers at least one side portion of the storage unit (110) and a back portion. The housing (200) is slidably arranged on or over the storage unit (110). Specifically, the housing (200) is slidable linearly along a longitudinal plane of the storage unit (110) between a first position (200*a*) and a second position (200*b*). The first position (200*a*) is when the housing (200) covers the storage unit (110) as shown in FIG. 2. The second position (200*b*) is when housing (200) is moved in a rearward position towards the second-row passengers as shown in FIG. 3. The housing (200) configures a storage compartment (210) in the second position (200*b*) for storing articles and the storage compartment (210) is accessible to the second-row passengers as shown in FIGS. 4, 5, 6 and 7. When the housing (200) is in the second position (200*b*), the front row passengers can access the front storage unit (110) and the second-row passengers can access the storage compartment (210) simultaneously.

In the present embodiment, the housing (200) has a lid (220) for covering the storage unit (110). The lid (220) is also moveable along with the housing (200) when the housing (200) moves between the first position (200*a*) and the second position (200*b*). The lid (220) is movably arranged on a portion of the housing (200) such that in the first position (200*a*) of the housing (200) the lid (220) pivot around a pivotal axis (220*a*) to provide access to the storage unit (110). In the present embodiment, the lid (220) is pivotally arranged on a top portion of the housing (200). When the housing (200) is in the first position (200*a*), the front row passengers can access the storage unit (110) by lifting the lid (220) around the pivotal axis (220*a*).

Figure 5:
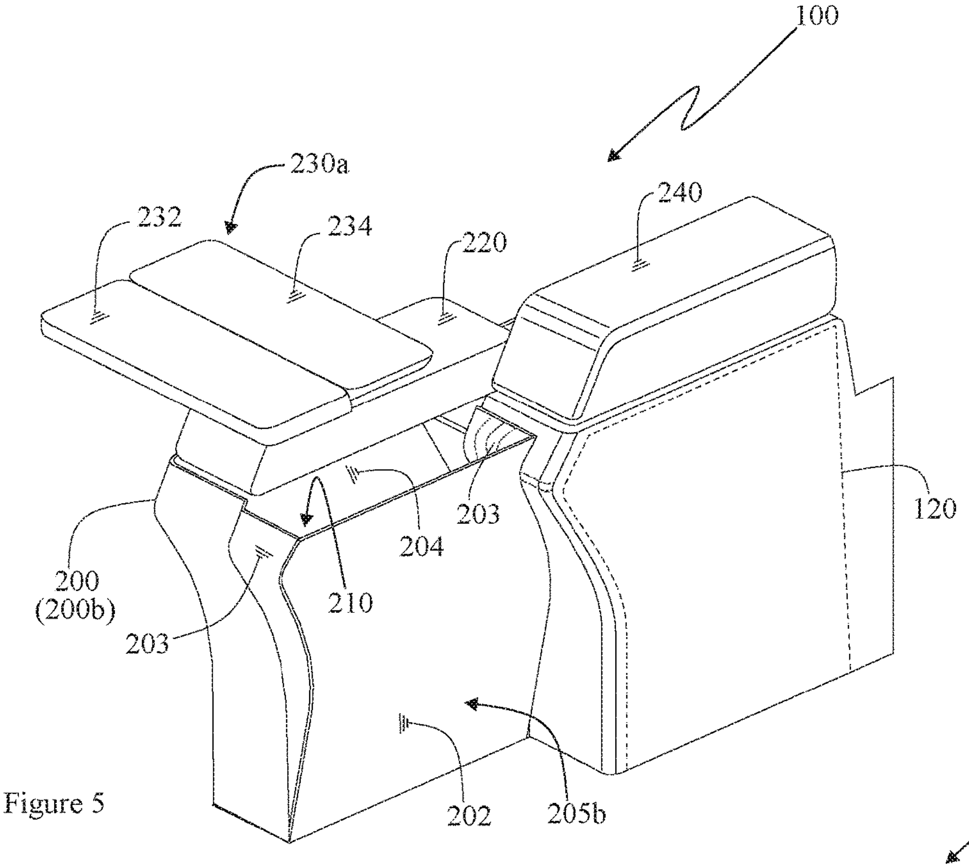
FIG. 5 illustrates a perspective view of the storage console when the housing configures a storage compartment in the second position.
Figure 6:
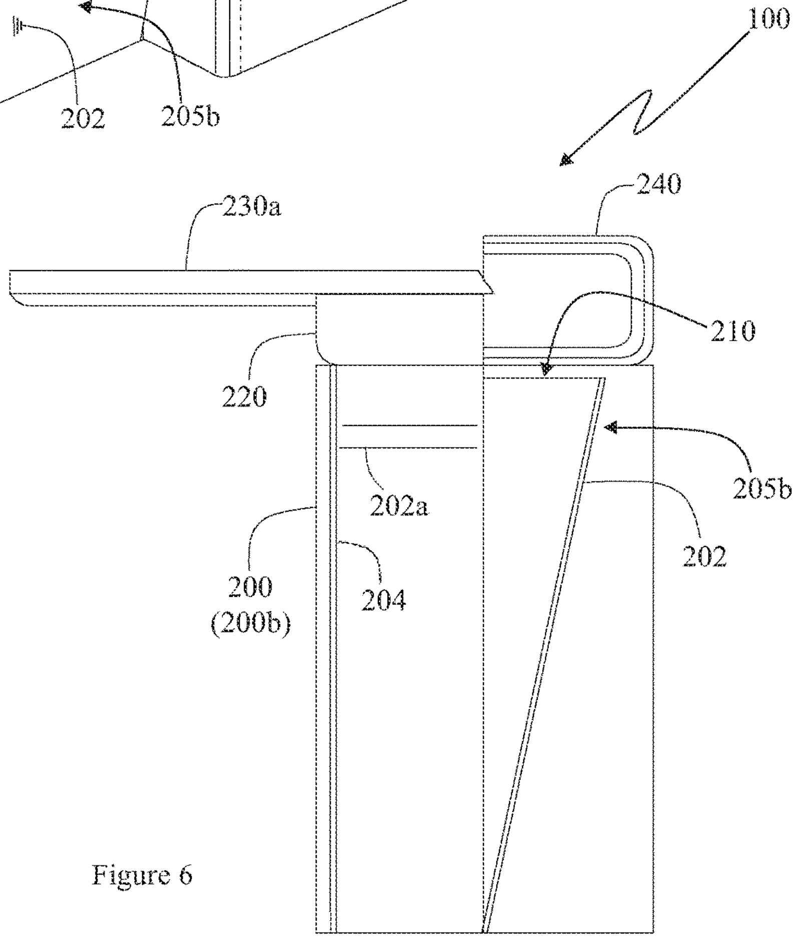
FIG. 6 illustrates a back side view of the storage console when the housing configures a storage compartment in the second position.
Figure 7:
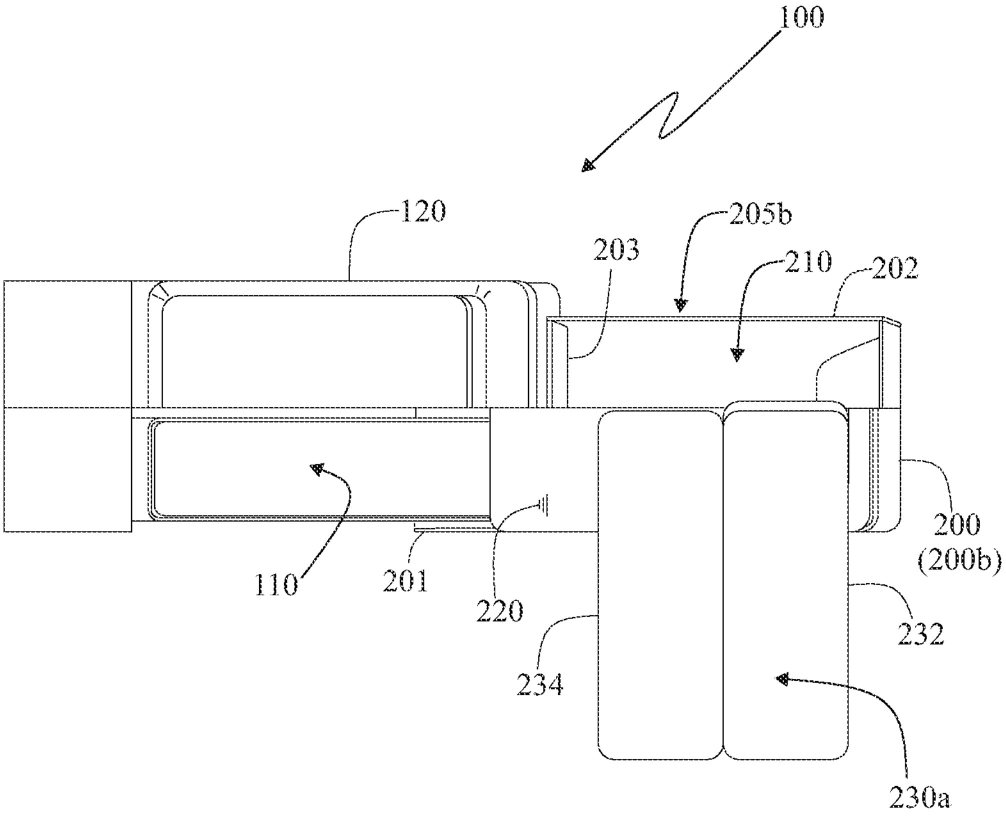
FIG. 7 illustrates a top view of the storage console when the housing configures a storage compartment in the second position and when the foldable tray in a useful position.

Referring to FIG. 5, the housing (200) has a side wall portion (202) movable between a stowed position (205*a*) (FIG. 3) and a deployed position (205*b*) when the housing (200) is in the second position (200*b*). The side wall portion (202) is arranged at an inner side portion of the housing (200) when in the stowed position (205*a*). When the housing (200) is moved rearwards or in the second position (200*b*), the side wall portion (202) moves to the deployed position (205*b*) away from the inner side portion of the housing (200). In the deployed position (205*b*) of the side wall portion (202), the housing (200) configures and provides access to the storage compartment (210) as shown in FIGS. 5, 6 and 7.

Further, the side wall portion (202) flushes to the housing (200) in the stowed position (205*a*) as shown in FIG. 3. Specifically, the side wall portion (202) has a corrugated side portion (203) which connects with an inner side wall (204) of the housing (200). The corrugated side portion (203) facilitates the movement of the side wall portion (202) between the deployed position (205*b*) and the stowed position (205*a*). When moving to the stowed position (205*a*), the corrugated side portion (203) collapses and facilitates the side wall portion (202) becoming flush against the inner side portion of the housing (200) so that it is aligned in parallel with inner side wall (204) of the housing (200). The movement of the side wall portion (202) can be controlled manually or by means of a motor. In the present embodiment, the side wall portion (202) is moved manually.

When the housing (200) slides to the second position (200*b*) from the first position (200*a*), the side wall portion (202) moves or can be moved to the deployed position (205*b*) and the second-row occupant can add or remove the articles from the storage compartment (210) and can return the side wall portion (202) to the stowed position (205*a*). In an embodiment, the side wall portion (202) may have a locking arrangement (202*a*) to keep the side wall portion (202) in the stowed position (205*a*). By way of non-limiting example, the housing (200) may have a magnetic arrangement to arrest the side wall portion (202) in the stowed position (205*a*). In another embodiment, the storage unit (110) may have a secondary storage space to accommodate the side wall portion (202) when the housing (200) slides back to the first position (200*a*).

In an embodiment, the side wall portion (202) has an articulated structure. When the housing (200) is in the first position (200*a*), the side wall portion (202) is in a collapsible state where the side wall portion (202) is stored on a back side portion of the front storage unit (110). There may be a plurality of joints which may joins together and expands to form the side wall portion (202) when the housing (200) slides to the second position (200*b*). When the housing (200) slides back to the first position (200*a*), the side wall portion (202) collapses and may get stored on the back side portion of the front storage unit (110).

Further, the housing (200) is slidable on a guide (201) arranged on the floor of the vehicle or on a periphery of the storage unit (110). The guide (201) can be a channel or a rail like structure to facilitate the sliding motion of the housing (200) towards the second position (200*b*). It may be obvious to a person skilled in the art to configure any other obvious arrangement to provide sliding motion to the housing (200). The housing (200) can be operated manually or is electrically operable.

Referring now to FIGS. 5, 6 and 7, the storage console (100) has an armrest (230) mounted on a top portion of the lid (220). In the present embodiment, the armrest (230) is a foldable unit which is swivelable around a rotational axis. The armrest (230) has a first armrest portion (232) and a second armrest portion (234). The first armrest portion (232) and the second armrest portion (234) are substantially flat members which are adjoined together on a side portion. Specifically, the first armrest portion (232) and the second armrest portion (234) are pivotally connected to the side portion such that the first armrest portion (232) is foldable over the second armrest portion (234). When the first armrest portion (232) is unfolded, the first armrest portion (232) aligns in the same plane of the second armrest portion (234) configuring a rectangular tray (230*a*) for holding articles as shown in FIGS. 5, 6 and 7. By way of non-limiting example, the tray can be used for holding a laptop or book or bottles or glasses.

In an embodiment, the storage console (100) includes a locking and unlocking unit (102). The locking unit (102) locks the position of the housing (200) according to the user requirement. Specifically, the locking unit (102) may prevent the sliding movement of the housing (200) when the storage compartment (210) is used by the occupants. The locking unit (102) may be a manual push lock or electrically driven lock or the like. When the storage compartment (210) is not in use, the occupant can unlock the position of the housing (200) to slide back the housing (200) towards the first position (200*a*).

Further, the housing (200) can be movable manually or is electrically operable. In an embodiment the storage console (100) has a handle to push or pull the housing (200) in between the first position (200*a*) and the second position (200*b*). In another embodiment, the housing (200) is electrically operable.

In the present embodiment, the console unit (100) includes two storage units (110, 120) as shown in FIGS. 2 and 3. Both the storage units (110, 120) are partially covered by housings (200, 300). Each housing (200, 300) can be pulled separately between a first position (200*a*) and a second position (200*b*) to configure respective storage compartments. Each storage compartments can be accessible to the rear row passengers. Further, each storage units (110, 120) can be accessible by lifting respective armrests (230, 240).

Therefore, one advantage of the illustrated embodiment of present invention is that it provides a storage console for a vehicle with two storage compartments accessible simultaneous to front row passengers and rear row passengers. The storage console has a foldable armrest unit to configure a tray to hold articles such as laptop, book and the like. It has a compact arrangement to configure the storage compartment for the rear row passengers. Also, the storage console has a simple mechanism for easy operation.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The invention claimed is:

1. A storage console for a vehicle, comprising:

at least one storage unit including a storage space for storing articles therein and adapted to be arranged adjacent a front row seat of the vehicle;

a housing at least partially enclosing the storage unit, the housing is slidably arranged on or over the storage unit such that it slides linearly along a longitudinal plane of the storage unit between a first position and a second position;

wherein the housing has a lid for covering the storage unit such that the lid is also moveable along with the housing when the housing moves between the first position and the second position, wherein the lid is movably arranged on a portion of the housing such that in the first position of the housing the lid pivots around a pivotal axis so as to provide access to the storage unit.

2. The storage console as claimed in claim 1, wherein the housing has a side wall portion movable between a stowed position and a deployed position when the housing is in the second position.

3. The storage console as claimed in claim 2, wherein an armrest is mounted on a top portion of the lid, the armrest is a foldable unit which is swivelable around a rotational axis.

4. The storage console as claimed in claim 3, wherein the armrest has a first armrest portion and a second armrest portion, the first armrest portion and the second armrest portion are pivotally connected such that the first armrest portion is foldable over the second armrest portion.

5. The storage console as claimed in claim 4, wherein when the first armrest portion is unfolded, the first armrest portion aligns in the same plane of the second armrest portion configuring a rectangular tray for holding articles.

6. The storage console as claimed in claim 2, wherein when the housing is moved to the second position, the side wall portion moves to the deployed position away from an inner side portion of the housing, in the deployed position of the side wall portion the housing configures a storage compartment.

7. The storage console as claimed in claim 6, wherein the side wall portion is positioned flush to the inner side portion of the housing in the stowed position.

8. The storage console as claimed in claim 6, wherein the side wall portion has a corrugated side portion which connects with an inner side wall of the housing, the corrugated side portion facilitates the movement of the side wall portion between the deployed position and the stowed position.

9. The storage console as claimed in claim 8, wherein in the stowed position, the corrugated side portion collapses and facilitates the side wall portion becoming aligned with the inner side wall of the housing.

10. The storage console as claimed in claim 2, wherein the side wall portion has a locking arrangement to arrest the side wall portion in the stowed position.

11. The storage console as claimed in claim 1, wherein the housing is slidable on a guide arranged on the floor of the vehicle or on a periphery of the storage unit.

12. The storage console as claimed in claim 1, wherein the storage console includes a locking and unlocking unit, the locking and unlocking unit locks the position of the housing and prevents sliding movement of the housing when a storage compartment is in use.

* * * * *